Oct. 4, 1955    C. J. O'NEILL    2,719,320
TAILGATE COUNTERBALANCING DEVICE
Filed Jan. 17, 1951
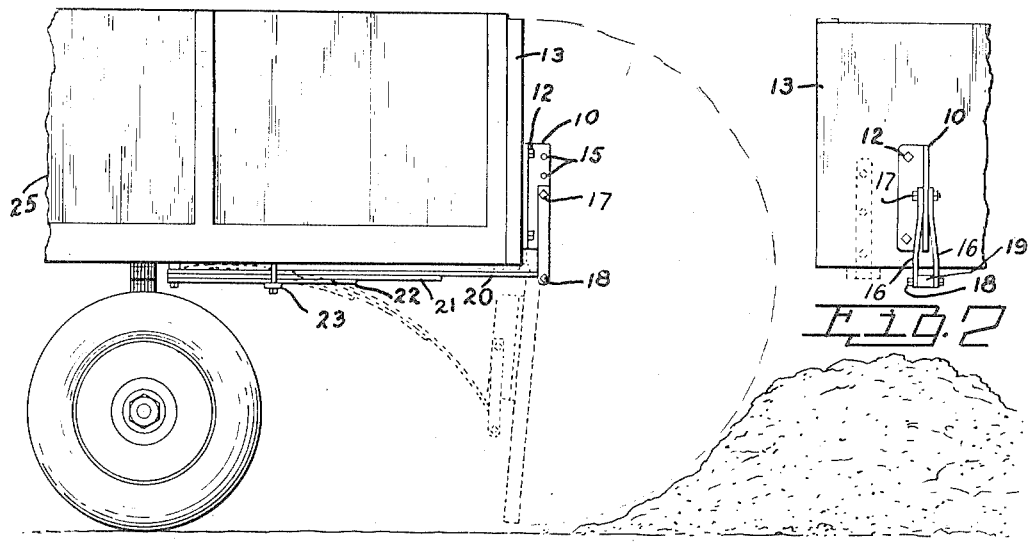
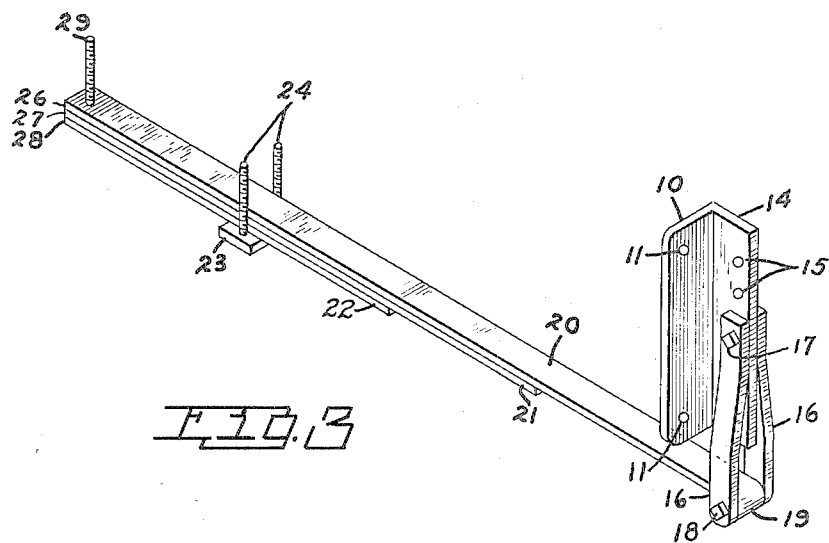
INVENTOR
CHARLES J. O'NEILL
BY
J. B. Dickman, Jr.
ATTORNEY

United States Patent Office 2,719,320
Patented Oct. 4, 1955

2,719,320

TAILGATE COUNTERBALANCING DEVICE

Charles J. O'Neill, Manteno, Ill.

Application January 17, 1951, Serial No. 206,325

2 Claims. (Cl. 16—80)

The present invention relates to counterbalancing means for vehicle tailgates, and has for one of its objects a device of the character described which may easily be installed and very efficient.

A further object of the present invention is the provision of counterbalancing means for vehicle tailgates which is inexpensive.

A still further object of the present invention is the provision of a tailgate counterbalancing device which will render the heaviest tailgate light enough to be handled by a single man.

A still further object of the present invention is the provision of a tailgate counterbalancing device which is adjustable to different weights of tailgates.

A still further object of the present invention is the provision of a tailgate counterbalancing device which will not interfere with the normal operation of a truck, and may be installed in multiple if the weight of the tailgate warrants it.

Other and further objects of the present invention will appear in the following description and claims hereto appended, and the drawing forming a part thereof, wherein:

Figure 1 is a side elevational view of the device attached to the tailgate of a truck, the dotted lines representing the open position of the tailgate, portions of the truck being shown fragmentary.

Figure 2 is an elevational view of a portion of a tailgate and showing the device attached thereto.

Figure 3 is a perspective view per se of the device assembled and ready to attach to a vehicle.

It is a well known fact that tailgates on trucks today are usually very heavy and in many cases require two or more men to raise them once they have been lowered. Also there is extensive damage done to the trucks and tailgates today due to the universal practice of allowing the tailgates to drop down after being unlatched. Even if a man does not deliberately allow the gate to drop, it usually drops in spite of his efforts, as its weight is too great to allow one man to lower it easily.

With the present invention, the tailgate may be effectively balanced so that it may be easily raised or lowered by one man, thus eliminating damage to the truck, tailgate or the man himself.

Referring to the drawing the numeral 10 represents an angle bracket having apertures 11 through which pass bolts 12 that secure the bracket at any convenient location on a tailgate, the bolts passing through the tailgate 13. The arm 14 of bracket 10 is provided with a plurality of apertures 15 that are in spaced relation. A pair of links 16 are provided, the ends being provided with apertures. The apertures in the top ends of the links receive bolts 17 that engage any one of the apertures 15 depending on the tension desired, the links 16 may be straight or they may be irregularly shaped as shown in the drawing.

The lower apertures in the links 16 receive a bolt 18 that passes through the inturned eye 19 on one end of spring 20, which mounts the end of the spring for pivotal movement. Leaf springs 21 and 22 are added if necessary or may be left off depending upon the weight of the tailgate to be balanced and the tension required.

The leaves 21 and 22 are held in alignment with spring 20 by a shackle that comprises a plate 23 upon which the springs rest and bolts 24. The shackle may be positioned in any desired position on the springs and it is secured to the floor of a truck 25 by the bolts 24 passing through apertures in the floor of the truck and being secured by nuts (not shown). The ends 26, 27 and 28 of springs 20, 21 and 22 are each provided with an aperture that receives a bolt 29 that passes through the floor of the truck and is secured by a nut.

The gate is cushioned when it is being lowered by the tension of the springs 20, 21 and 22, which normally lie adjacent the bottom of the truck body. They therefore exert an upward tension and as the gate is lowered the links 16 travel downwardly, in turn forcing the springs downwardly. The pivotal arrangement of the links 16 on the spring at their lower ends and on the bracket on their upper end create a constant tension throughout the whole 180° movement of the tailgate. The links do not have as much movement, the maximum being about 45° from the vertical when the gate is in its horizontal position, therefore, there is at all times an upward tension on the tailgate which cushions the lowering and assists the raising. The moment of the tailgate is greater as it approaches and crosses the horizontal position.

What is claimed is:

1. A counterbalancing device for a vehicle tailgate, said tailgate being normally disposed in an upright position and hinged at its lower edge to the rear end of the vehicle floor, comprising a bracket adapted to be secured to the outer face of the tailgate, a flat leaf spring underlying and adapted to be secured to the rear end of the vehicle floor and projecting rearwardly thereof to a position wherein its rear end underlies said bracket, a plurality of normally upright links pivotally mounted on said bracket at their upper ends and pivotally connected at their lower ends to the rear end of said spring, whereby when said tailgate is opened, said upright links are displaced downwardly against the resistance offered by flexure of said spring and a diminishing counterbalancing effect is imposed on said tailgate as it approaches its uppermost or lowermost positions.

2. A tailgate counterbalancing means as defined in claim 1, said bracket being pivotally connected to the upper ends of said links by a shackle bolt and provided with a plurality of bolt holes for selective engagement by the shackle bolt.

References Cited in the file of this patent

UNITED STATES PATENTS

| Number | Name | Date |
|---|---|---|
| 563,058 | Peck | June 30, 1896 |
| 709,193 | Barson | Sept. 16, 1902 |
| 1,755,685 | Cowley | Apr. 22, 1930 |
| 1,963,388 | Smith | June 19, 1934 |
| 2,113,291 | Clark | Apr. 5, 1938 |
| 2,151,335 | Rush | Mar. 21, 1939 |
| 2,534,626 | Rubenstein | Dec. 19, 1950 |

FOREIGN PATENTS

| Number | Country | Date |
|---|---|---|
| 446 | Australia | Feb. 5, 1926 |
| 433,813 | Great Britain | Aug. 21, 1935 |